United States Patent
Muranaka et al.

[11] Patent Number: 5,887,728
[45] Date of Patent: Mar. 30, 1999

[54] SEPARATOR AND SEPARATION METHOD

[75] Inventors: Yuji Muranaka, Sabae; Shigeo Yaichi, Fukui, both of Japan

[73] Assignee: Murata Manufacturing Co., Ltd., Japan

[21] Appl. No.: 686,326

[22] Filed: Jul. 25, 1996

[30] Foreign Application Priority Data

Jul. 26, 1995 [JP] Japan ................................. 7-189903

[51] Int. Cl.$^6$ .................................................. B07C 5/344
[52] U.S. Cl. ........................ 209/636; 209/214; 209/215; 209/219; 209/225; 209/231
[58] Field of Search .................... 209/636, 214, 209/215, 218, 219, 225, 231

[56] References Cited

U.S. PATENT DOCUMENTS

| | | | |
|---|---|---|---|
| 400,746 | 4/1889 | Conkling | 209/214 X |
| 2,745,549 | 5/1956 | Spodig | 209/219 |
| 4,178,236 | 12/1979 | Theurer | 209/215 |
| 4,302,245 | 11/1981 | Winters | 209/214 |

*Primary Examiner*—David H. Bollinger

[57] ABSTRACT

A mixture of electronic component chips 2 and media 3 is placed in a planar state on a transport surface 4 of a conveyor 5. Only the media 3 are collected onto a first circulating circumferential surface 18 by a magnetic force provided by a first collection member 12 and are thereafter collected by a media collecting box 22. Then, only electronic component chips 2 having a plating film of a proper thickness formed thereon are attracted onto a second circumferential surface 28 by a magnetic force provided by a second collection member 23 and are thereafter collected by a good product collecting box 31. Electronic component chips 2a having a plating film of an insufficient thickness formed thereon are collected by a defective product collecting box 32.

12 Claims, 2 Drawing Sheets

SEPARATOR AND SEPARATION METHOD

BACKGROUND OF THE INVENTION

1. Field of the Invention

The present invention relates to a separator and a separation method utilizing magnetism. For example, the present invention relates to a separator and a separation method which can be advantageously applied to processing steps which may be carried out during the manufacture of electronic components such as separation of media for electro-plating and electronic component chips and screening of good and defective electronic component chips based on whether or not the thickness of metal films formed on the surface thereof is proper.

2. Description of the Related Art

The manufacture of electronic components may involve an electro-plating process and a polishing process on electronic component chips, and such processes are normally performed with media mixed with the electronic component chips. This results in a need for separating the media from the electronic component chips after the processes. A mesh basket may be used during such separation of media and electronic component chips. This is to separate media and electronic component chips utilizing a difference between their dimensions by choosing a mesh size that allows only either media or electronic component chips which are smaller in dimensions to pass.

Further, when a metal film such as an electrode is to be formed on the surface of electronic component chips, barrel plating may be used to process a great number of electronic component chips at one time. However, some chips may not have a plating film of sufficient thickness formed thereon. Electronic component chips having such a plating film of an improper thickness must be eliminated. It is therefore necessary to determine whether or not a plating film has been formed to a sufficient thickness. However, heretofore there has been no efficient way to determine for an entire lot of electronic components whether or not the thickness of the plating films is proper. Instead, what has been done is only to sample several electronic component chips and observe their sections using a microscope or the like.

However, the separation of media and electronic component chips and the screening of good and defective electronic component chips based on whether or not the thickness of metal films formed on the surface thereof is proper as described above present a problem in that, in either case, troublesome and inefficient processes are involved and the certainty and reliability of separation is low.

It is therefore an object of the present invention to provide a separator and a separation method which can solve the above-described problem.

SUMMARY OF THE INVENTION

Briefly, the present invention utilizes magnetism in that separation is performed based on a difference in magnetism.

The present invention is first directed to a separator for separating a mixture of a first object having relatively strong magnetism and a second object having relatively weak magnetism into the first and second objects. This separator includes a conveyor-having a transport surface for transporting the mixture placed thereon, preferably in a planar state. A collection member having a circulating circumferential surface is disposed so that the circumferential surface faces the transport surface of the conveyor at a predetermined interval, the collection member providing a magnetic force to allow only the first object to be attracted by the collection member collected onto the circumferential surface. A pick-up means is provided for picking up the first object collected on the circumferential surface.

It should be noted that "relatively weak magnetism" or "the weakest magnetism" as used in the specification and claims also means "no magnetism".

In such a separator, the mixture is placed on the transport surface of the conveyor, preferably in a planar state, and transported to a position where it faces the collection member. Then, the first object is collected by the circumferential surface of the collection member due to magnetic force and is thereby separated from the second object. The first object thus collected is transported to the position of the pick-up means as a result of the circulation of the circumferential surface of the collection member and is picked up by the pick-up means. On the other hand, the second object is left on the conveyor to be transported further.

The present invention is preferably applied to steps for manufacturing electronic components.

For example, the present invention may be applied to the separation of media of magnetic material used in electroplating from electronic component chips which have been plated by being mixed with such media. In this case, the media of magnetic material correspond to the above-described first object and the electronic component chips correspond to the above-described second object.

Further, the present invention may be applied to a case wherein the first and second objects are first and second electronic component chips, respectively, having a film of magnetic material formed on the surface thereof and wherein the film on the first electronic component chip is formed thicker than the film on the second electronic component chip. The separation of the first and second electronic component chips as described above is effective for purposes such as eliminating electronic components of an insufficient film thickness. In the specification and claims, a statement that a film thickness is insufficient also includes a case wherein no film is formed at all.

Furthermore, the present invention may be applied to separation of electronic component chips having magnetism at least in a part thereof and media of non-magnetic material which have been used to polish the electronic component chips. In this case, the above-described first object corresponds to the electronic component chips and the above-described second object corresponds to the media of non-magnetic material.

The present invention may be further applied to a separator for separating a mixture of first, second and third objects into the first, second, and third objects, wherein the first object has the strongest magnetism, the second object has the second strongest magnetism, and the third object has the weakest magnetism. This separator includes a conveyor having a transport surface for transporting the mixture placed thereon, preferably in a planar state. A first collection member having a first circulating circumferential surface is disposed so that the first circulating surface faces the transport surface of the conveyor at a predetermined interval, the first collection member providing a magnetic force to allow only the first object to be attracted by the first collection member and collected onto the first circumferential surface. A first pick-up means is provided for picking up the first object collected on the first circumferential surface. A second collection member having a second circulating circumferential surface is disposed downstream of the first collection member in the direction of the transportation by the conveyor so that the second circumferential surface faces the transport surface of the conveyor at a predetermined interval, the second collection member providing a magnetic force to allow only the second object to be attracted by the second collection member and onto the second circumferential surface. A second pick-up means is provided for picking up the second object collected on the second circumferential surface.

For example, the above-described separator may be advantageously applied to separation of media of magnetic material used in electro-plating and electronic component chips which have been plated by being mixed with the media and subsequent screening of good and defective components based on whether or not the thickness of plating films is proper. In this case, the above-described first object corresponds to the media of magnetic material, and the second and third objects respectively correspond to first and second electronic component chips plated by being mixed with the media. The first electronic component chip has a plating film of magnetic material having a proper thickness formed-on the surface thereof, and the second electronic component chip has a plating film of magnetic material having an insufficient thickness formed on the surface thereof.

The present invention is also directed to a separation method for separating a mixture of a first object having relatively strong magnetism and a second object having relatively weak magnetism into the first and second objects. This separation method includes the steps of placing the mixture on a surface, preferably in a planar state, disposing a collection member having a circumferential surface which provides a magnetic force capable of attracting only the first object so that the circumferential surface faces the surface on which the mixture is placed at a predetermined interval, and attracting only the first object onto the circumferential surface while circulating the circumferential surface of the absorbing member.

The present invention is also directed to a separation method for separating a mixture of first, second and third objects into the first, second, and third objects, wherein the first object has the strongest magnetism, the second object has the second strongest magnetism, and the third object has the weakest magnetism. This separation method includes the steps of placing the mixture on a surface, preferably in a planar state, removing the first object from the mixture by bringing a first collection member providing a magnetic force capable of attracting and collecting only the first object close to the mixture to collect only the first object and then removing the second object by bringing a second collection member providing a magnetic force capable of attracting and collecting only the second object close to the second and third objects to collect only the second object.

As described above, the present invention allows efficient, certain and reliable separation because only a particular object is absorbed and picked up from a mixture utilizing magnetism.

Further, a relatively wide range of application can be expected from the present invention because it allows separation regardless of the presence of a dimensional difference as long as there is a difference in the strength of magnetism.

Further, according to the present invention, the use of a collection member having a circulating circumferential surface allows a particular object to be continuously picked up as the circumferential surface makes a circulating motion. The use of a conveyor for the transportation of a mixture to be separated allows the mixture to be supplied continuously. In addition, a separation process can be continuously performed by using both the collection member having the circulating circumferential surface and the conveyor as described above.

Furthermore, when applied to separation of electronic component chips and media for plating or polishing or to screening based on the thickness of films formed on electronic component chips during the manufacture of electronic components, the present invention allows the manufacturing efficiency of the electronic components to be improved and allows screening of good and defective components to be performed with higher accuracy and reliability. As a result, a reduction in the cost of electronic components can be expected.

DETAILED DESCRIPTION OF THE PREFERRED EMBODIMENT(S)

Figure 1:
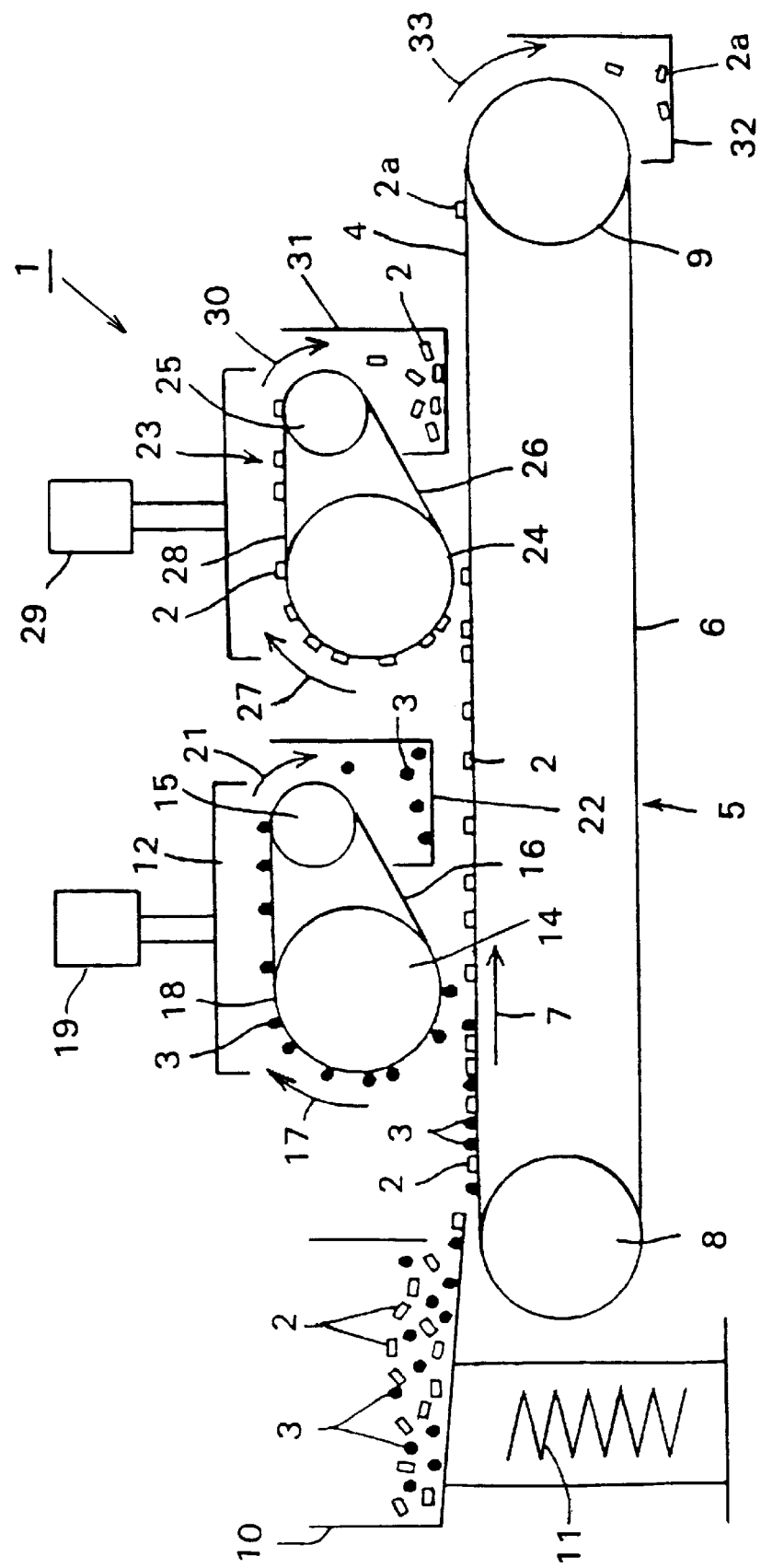
FIG. 1 is a front view illustrating a separator 1 according to an embodiment of the present invention.

FIG. 1 is a front view illustrating a separator 1 according to an embodiment of the present invention which is applied to steps for manufacturing electronic components. More specifically, the separator 1 is used for separating electronic component chips 2 and media 3 of magnetic material which have been used for electro-plating the chips 2 and is also used for subsequently removing only electronic component chips 2 having a plating film of an insufficient thickness formed thereon to thereby screen only good electronic component chips 2.

The manufacturing steps described above are used during the manufacture of multilayer ceramic capacitors. Specifically, when multilayer ceramic capacitors are manufactured, electronic component chips are prepared which include outer terminal electrodes formed by firing a paste including a metal. Next, the electronic component chips are mixed with media made of steel to be electroplated to form nickel films as magnetic elements on the outer terminal electrodes. Therefore, the electronic component chips and the media must be separated when the plating process is finished. Further, the plating process does not necessarily form a plating film of a proper thickness on all of the electronic component chips, and electronic component chips having a plating film of an insufficient thickness formed thereon must be eliminated as defective products. A solder film may be formed by means of plating after the nickel film as a magnetic element is formed on the outer terminal electrode.

Referring to FIG. 1, the separator 1 includes a conveyor 5 having a transport surface 4 for transporting a mixture of the electronic component chips 2 and the media 3 placed thereon, preferably in a planar state. For example, the conveyor 5 is constituted by a belt-conveyor including a belt 6 and a pair of belt pulleys 8 and 9 around which the belt 6 is wound to be driven for circulation in the direction of the arrow 7.

A hopper 10 is provided at the upstream end of the transport surface 4 for supplying the mixture of the electronic component chips 2 and media 3 onto the transport surface 4. Preferably, vibration is applied to the hopper 10 from a vibrator 11 to allow the mixture to be properly supplied onto the transport surface 4 without gathering into a clump. Further, consideration is also given to the shape and dimensions of the exit of the hopper 10 to prevent the mixture from being ejected in the form of a clump.

Figure 2:
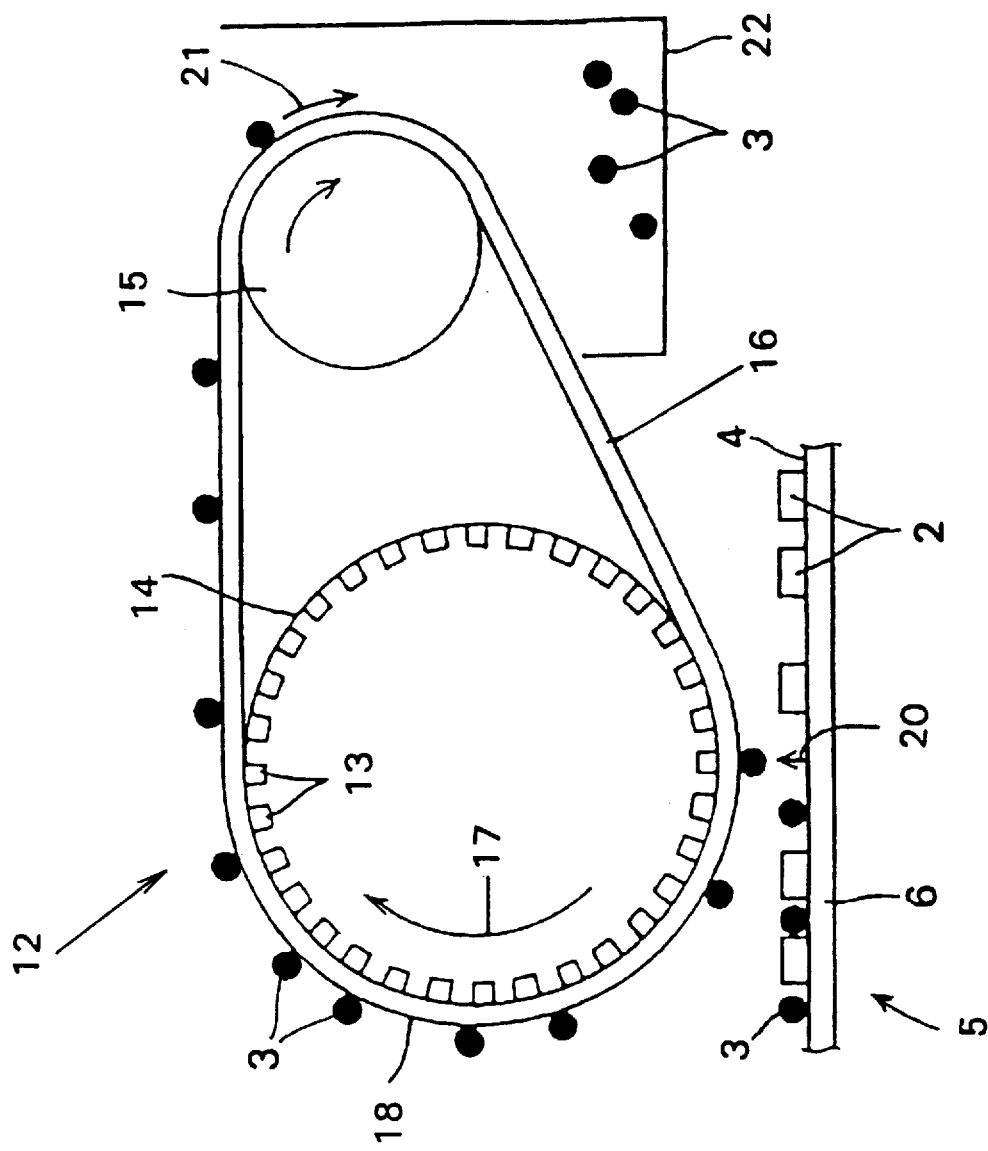
FIG. 2 is an enlarged front view of a first collection member 12 included in the separator 1 shown in FIG. 1.

A first collection member 12 is disposed in a position which is downstream of the above-described hopper 10 and at an upstream position of the transport surface 4. FIG. 2 shows the structure of the first collection member 12 in detail. The first collection member 12 includes a magnetic drum 14 having a plurality of magnets 13 disposed on the circumferential surface thereof, a tension roller 15 disposed in parallel with the magnetic drum 14, and a belt 16 made of rubber, for example, wound around the roller 15. The belt 16 is driven for circulation in the direction of the arrow 17. Thus, the outwardly facing surface of the belt 16 serves as a first circulating circumferential surface 18 of the first collection member 12.

The above-described first circumferential surface 18 is disposed so that it faces the transport surface 4 of the conveyor 5 at a predetermined interval in an area where the magnetic drum 14 and belt 16 are in contact. The magnets 13 on the magnetic drum 14 provide the first collection member 12 with a magnetic force capable of attracting only the media 3 which are made of steel, for example, having relatively strong magnetism.

The above-described interval between the first circumferential surface 18 and the transport surface 4 is preferably adjustable in order to allow the magnetic force applied to the media 3 and electronic component chips 2 to be adjusted. In this embodiment, the first collection member 12 is supported by a dial gage 19 for adjusting the interval. The adjustment of the magnetic force may alternatively be carried out by employing electromagnets as the magnet 13 and by varying a voltage applied thereto.

Thus, the media 3 on the transport surface 4 are collected by the first circumferential surface 18 and transported as the belt 16 circulates as indicated by the arrow 20 in FIG. 2.

A first pick-up means is provided with a configuration as described below for picking up the above-described media 3 retained on the first circumferential surface 18 at a fixed position on the path of the circulation of the first circumferential surface 18.

The magnetic force of the first collection member 12 provided by the magnets 13 becomes weaker as the belt 16 moves further from the magnetic drum 14. For example, the media 3 can not be retained on the first circumferential surface 18 by the magnetic force in an area where the belt 16 is in contact with the tension roller 15. Therefore, when the belt 16 is bent downward along the tension roller 15, the media 3 on the first collection member 18 drop as indicated by the arrow 21 due to gravity. Such dropped media 3 are collected by a media collecting box 22.

Such a configuration of the first pick-up means eliminates a need for a member, such as scraping means, for scraping the media 3 retained by the magnetic force from the belt 16. The first pickup means may be provided in the form of a scraping means where such an advantage is not desired.

Meanwhile, only the electronic component chips 2 are left on the transport surface 4 downstream of the first collection member 12. A second collection member 23 is provided downstream of the first collection member 12. The second collection member 23 has a structure similar to that of the first collection member 12. Specifically, the second collection member 23 includes a magnetic drum 24 having a plurality of magnets (not shown) disposed on the circumferential surface thereof, a tension roller 25 disposed in parallel with the magnetic drum 24, and a belt 26 made of rubber, for example, wound around the roller 25. The belt 26 is driven for circulation in the direction of the arrow 27. Thus, the outwardly facing surface of the belt 26 serves as a second circulating circumferential surface 28 of the second collection member 23.

Further, as in the first collection member 12, the above-described second circumferential surface 28 is disposed so that it faces the transport surface 4 of the conveyor 5 at a predetermined interval in an area where the magnetic drum 24 and belt 26 are in contact. The second collection member 23 provides a magnetic force capable of attracting only electronic component chips 2 having a plating film of magnetic material formed to a proper thickness on the surface thereof, i.e., electronic component chips 2 which are good products.

The above-described interval between the second circumferential surface 28 and the transport surface 4 is preferably adjustable in order to allow the magnetic force applied to the electronic component chips 2 to be adjusted. Therefore, like the above-described first collection member 12, the second collection member 23 is supported by a dial gage 29 for adjusting the interval. In this case, the adjustment of the magnetic force may be also carried out by varying a voltage applied to electromagnets.

Thus, only good electronic component chips 2 on the transport surface 4 are collected onto the second circumferential surface 28 and transported as the belt 26 circulates.

A second pick-up means is provided with a configuration as described below which is substantially the same as that of the above-described first pick-up means for picking up the above-described good electronic component chips 2 retained on the second circumferential surface 28 at a fixed position on the path of the circulation of the second circumferential surface 28.

The magnetic force of the second collection member 23 provided by the magnetic drum 24 becomes weaker as the belt 26 moves further from the magnetic drum 24. For example, the electronic component chips 2 can not be retained on the second circumferential surface 28 by the magnetic force in an area where the belt 26 is in contact with the tension roller 25. Therefore, when the belt 26 is bent downward along the tension roller 25, the electronic component chips 2 on the second circumferential surface 28 drop as indicated by the arrow 30, due to gravity. Such dropped electronic component chips 2 are collected by a good product collecting box 31.

Such a configuration of the second pick-up means eliminates a need for a member, such as scraping means, for scraping the electronic component chips 2 retained by the magnetic force from the belt 26. This makes it possible to pick up the electronic component chips 2 without damaging them. The pick-up means may be provided in the form of a scraping means where such an advantage is not desired.

In this regard, the second collection member 23 may have a configuration which substantially includes only the magnetic drum 24 and excludes the tension roller 25 and belt 26. In this case, the electronic component chips 2 are directly collected by the magnetic drum 24 and are picked up from the magnetic drum 24 using a member, such as a scraper, to scrape the electronic component chips 2 off of the magnetic drum 24. A similar modification may be applied to the first collection member 12.

Returning to the illustrated embodiment, what is now left on the transport surface 4 of the conveyor 5 downstream of the second collection member 23 are only electronic component chips 2a having a plating film of magnetic material formed to an insufficient thickness on the surface thereof, i.e., electronic component chips 2a which are defective products. A defective product collecting box 32 is disposed at the downstream end of the transport surface 4. Therefore, when the belt 6 is bent downward along the belt pulley 9, the defective electronic component chips 2a on the transport surface 4 drop, as indicated by the arrow 33, due to gravity and are collected by the defective product collecting box 32.

Having described the present invention with reference to the illustrated embodiment, various other embodiments may be employed within the scope of the present invention.

For example, although two collection members, i.e., the first collection member 12 and the second collection member 23, are provided along the path of the transportation by the conveyor 5 in the illustrated embodiment, a modification may be made wherein only one collection member is provided and, therefore, separation involves only one step. Alternatively, three or more collection members may be provided along one transportation path.

Further, the present invention may be applied to a step in the manufacture of electronic components for separating electronic component chips and media made of non-magnetic material used for polishing the same. In this case, at least a part of the electronic component chips has magnetism. For example, the electronic component chips incorporate electrodes including a magnetic material such as nickel or incorporate chip main bodies made of magnetic material. During separation, the electronic component chips are absorbed by the collection members to leave the media.

Furthermore, the present invention may be applied to separation of objects in fields other than electronic components as long as there is a difference in the strength of magnetism.

While a particular embodiment of the present invention has been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A separator for separating a mixture-of a first object having relatively strong magnetism and a second object having relatively weak magnetism into said first and second objects, said first object being media made of magnetic material used in electro-plating and said second object being electronic component chips which have been plated by being mixed with said media, said separator comprising:
    a conveyor having a transport surface for transporting said mixture placed thereon;
    a collection member having a circulating circumferential surface disposed so that said circumferential surface faces the transport surface of said conveyor at a predetermined interval, at least a portion of said collection member being magnetic for providing a magnetic force of a magnitude such that only said media is attracted by said collection member and collected onto said circumferential surface; and
    a pick-up means for picking up said media collected on said circumferential surface.

2. A separator according to claim 1, wherein said transport surface is planar for transporting said mixture in a planar state.

3. A separator according to claim 2, wherein said collection member is movably supported so that said interval between said circumferential surface and said transport surface may be varied.

4. A separation method for separating a mixture of a first object having relatively strong magnetism and a second object having relatively weak magnetism into said first and second objects, said first object being media made of magnetic material used in electro-plating and said second object being electronic component chips which have been plated by being mixed with said media, said separator comprising the steps of:
    placing said mixture on a surface;
    disposing a collection member having a circumferential surface at least a portion of which is magnetic to provide a magnetic force capable of attracting only said first object so that said circumferential surface faces said surface on which said mixture is placed at a predetermined interval; and
    attracting only said media onto said circumferential surface while circulating said circumferential surface of said collection member.

5. A separation method according to claim 4, wherein said mixture is placed on said surface in a planar state.

6. A separation method for separating a mixture of first, second and third objects into said first object, said second object and said third object, wherein said first object has the strongest magnetism of the first, second and third objects, said second object has the second strongest magnetism of the first, second and third objects, and said third object has the weakest magnetism of the first, second and third objects, said first object being media made of magnetic material used in electro-plating: said second and third objects being first and second electronic component chips, respectively, which have been plated by being mixed with said media; said first electronic component chip having a plating film made of magnetic material having a proper thickness formed on the surface thereof; and said second electronic component chip having a film made of magnetic material having an insufficient thickness formed on the surface thereof, said separation method comprising the steps of:
    placing said mixture on a surface;
    removing said media from said mixture by bringing a first collection member, at least a portion of which is magnetic for providing a magnetic force of a magnitude capable of attracting only said media, close to said mixture so that said first collection member attracts and collects only said media; and
    then removing said first electronic component chip by bringing a second collection member, at least a portion Of which is magnetic for providing a magnetic force of a magnitude capable of attracting only said first electronic component chip, close to said first and second electronic component chins so that said second collection member attracts and collects only said first electronic component chip.

7. A separation method according to claim 6, wherein said first object is media made of magnetic material used in electro-plating; said second and third objects are first and second electronic component chips, respectively, which have been plated by being mixed with said media; said first electronic component chip has a plating film made of magnetic material having a proper thickness formed on the surface thereof; and said second electronic component chip has a film made of magnetic material having an insufficient thickness formed on the surface thereof.

8. A separation method according to claim 6, wherein said mixture is placed on said surface in a planar state.

9. A separator for separating a mixture of a first object having relatively strong magnetism and a second object having relatively weak magnetism into said first and second objects, said first and second objects being first and second electronic component chips, respectively, having a film made of magnetic material formed on the surface thereof, said film on said first electronic component chip being formed thicker than said film on said second electronic component chip, said separator comprising:

a conveyor having a transport surface for transporting said mixture placed thereon;

a collection member having a circulating circumferential surface disposed so that said circumferential surface faces the transport surface of said conveyor at a predetermined interval, at least a portion of said collection member being magnetic for providing a magnetic force of a magnitude such that only said first electronic component chip is attracted by said collection member and collected onto said circumferential surface; and a pick-up means for picking up said first electronic component chip collected on said circumferential surface.

10. A separator for separating a mixture of a first object having relatively strong magnetism and a second object having relatively weak magnetism into said first and second objects, said first object being an electronic component chip having magnetism at least in a part thereof and said second object being media made of non-magnetic material which has been used to polish said electronic component chip, said separator comprising:

a conveyor having a transport surface for transporting said mixture placed thereon;

a collection member having a circulating circumferential surface disposed so that said circumferential surface faces the transport surface of said conveyor at a predetermined interval, at least a portion of said collection member being magnetic for providing a magnetic force of a magnitude such that only said electronic component chip is attracted by said collection member and collected onto said circumferential surface; and a pick-up means for picking up said electronic component chip object collected on said circumferential surface.

11. A separator for separating a mixture of first, second and third objects into said first, second, and third objects, wherein said first object has the strongest magnetism of the first, second and third objects, said second object has the second strongest magnetism of the first, second and third objects, and said third object has the weakest magnetism of the first, second and third objects, said first object being media made of magnetic material used in electroplating; said second and third objects being first and second electronic component chips, respectively, which have been plated by being mixed with said media; said first electronic component chip having a plating film made of magnetic material having a proper thickness formed on the surface thereof; and said second electronic component chip having a film made of magnetic material having an insufficient thickness formed on the surface thereof, said separator comprising:

a conveyor including a conveyor belt for transporting said mixture and a pair of belt pulleys for circulating said conveyor belt;

a hopper for supplying said mixture on said belt of said conveyor;

a first collection member including a first drum provided with a first magnetic circumferential surface, a first roller disposed opposite to said first drum, and a first belt which is wound to be driven for circulation around said first roller, said first collection member being disposed at a predetermined interval to said first belt and said magnetic circumferential surface exerting a magnetic force such that only said media is attracted to and collected by said circumferential surface;

a first pick-up means for picking up said media collected on said first circumferential surface;

a second collection member including a second drum provided with a second magnetic circumferential surface, a second roller disposed opposite to said second drum, and a second belt which is wound to be driven for circulation around said second roller, said second collection member being disposed at a predetermined interval to said second belt and said magnetic circumferential surface of said second collection member exerting a magnetic force such that only said first electronic component chips are attracted to and collected by said second circumferential surface; and a second pick-up means for picking up said first electronic component chip collected on said second circumferential surface.

12. A separator according to claim 11 wherein said first collection member is movably supported so that said interval between said first circumferential surface and said conveyor belt may be varied and wherein said second collection member is movably supported so that said interval between said second circumferential surface and said conveyor belt may be varied.

* * * * *